(12) United States Patent
Hidaka et al.

(10) Patent No.: US 12,405,182 B2
(45) Date of Patent: Sep. 2, 2025

(54) COVER COMPONENT FOR PRESSURE SENSOR, AND PRESSURE SENSOR DEVICE COMPRISING SAME

(71) Applicant: FUJIKIN INCORPORATED, Osaka (JP)

(72) Inventors: Atsushi Hidaka, Osaka (JP); Takatoshi Nakatani, Osaka (JP); Tomokazu Hirota, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 325 days.

(21) Appl. No.: 18/040,917

(22) PCT Filed: Sep. 14, 2021

(86) PCT No.: PCT/JP2021/033812
§ 371 (c)(1),
(2) Date: Feb. 7, 2023

(87) PCT Pub. No.: WO2022/080069
PCT Pub. Date: Apr. 21, 2022

(65) Prior Publication Data
US 2023/0296464 A1    Sep. 21, 2023

(30) Foreign Application Priority Data
Oct. 15, 2020    (JP) .................... 2020-173730

(51) Int. Cl.
*G01L 19/14*    (2006.01)
*G01L 7/08*    (2006.01)
*G01L 19/00*    (2006.01)

(52) U.S. Cl.
CPC .............. *G01L 19/147* (2013.01); *G01L 7/08* (2013.01); *G01L 19/0084* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 5,115,676 A     5/1992  Lee
5,948,992 A *   9/1999  Yamamoto .......... G01L 19/0084
                                                73/754
(Continued)

FOREIGN PATENT DOCUMENTS

EP    2105716 B1 * 12/2016 .......... G01D 11/245
JP    2000-304637 A    11/2000
(Continued)

OTHER PUBLICATIONS

International Search Report issued in PCT/JP2021/033812; mailed Oct. 19, 2021.

*Primary Examiner* — Andre J Allen
(74) *Attorney, Agent, or Firm* — Studebaker Brackett PLLC

(57) ABSTRACT

A cover component 3 is used for a pressure sensor 1 that is fixed to a mounting surface 5S of a body 5 with a flow path F1 formed therein, and that has protrudes protruding from the mounting surface 5S, the cover component comprising a hollow member 3a having an inner peripheral surface facing a side surface of the protruding portion of the pressure sensor 1, and a cover member 3b fixed to the hollow member 3a and covering the protruding portion of the pressure sensor 1.

8 Claims, 8 Drawing Sheets

(58) Field of Classification Search
CPC .......... G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................. 73/700–756

See application file for complete search history.

(56) References Cited

U.S. PATENT DOCUMENTS

| | | | |
|---|---|---|---|
| 6,302,130 | B1 | 10/2001 | Ohmi et al. |
| 8,256,299 | B2* | 9/2012 | Mitschke .............. G01L 27/007 |
| | | | 361/283.4 |
| 8,934,263 | B2* | 1/2015 | Eckhardt ............. G01L 19/0654 |
| | | | 73/756 |
| 2012/0297886 | A1 | 11/2012 | Lee et al. |
| 2013/0055821 | A1* | 3/2013 | Bentley ................ G01L 9/0054 |
| | | | 73/721 |
| 2013/0205907 | A1 | 8/2013 | Fukano et al. |
| 2014/0150559 | A1* | 6/2014 | Ishihara ................ G01L 19/02 |
| | | | 73/718 |

(56) References Cited

U.S. PATENT DOCUMENTS

| | | | | |
|---|---|---|---|---|
| 2014/0202255 A1* | 7/2014 | Niemann | ................ | G01L 9/008 |
| | | | | 73/753 |
| 2016/0116359 A1* | 4/2016 | Tu | ......................... | G01L 19/147 |
| | | | | 73/756 |
| 2018/0313709 A1* | 11/2018 | Chiou | ................... | B81B 7/0061 |
| 2020/0149162 A1 | 5/2020 | Hidaka et al. | | |
| 2021/0356346 A1 | 11/2021 | Hidaka et al. | | |

FOREIGN PATENT DOCUMENTS

| | | | |
|---|---|---|---|
| JP | 3546153 B2 | | 7/2004 |
| TW | 201337227 A | | 9/2013 |
| WO | WO 8911640 A1 | * | 11/1989 |
| WO | 2019/021948 A1 | | 1/2019 |
| WO | 2020/075600 A1 | | 4/2020 |

* cited by examiner

COVER COMPONENT FOR PRESSURE SENSOR, AND PRESSURE SENSOR DEVICE COMPRISING SAME

TECHNICAL FIELD

The present invention relates to a cover component for a pressure sensor and a pressure sensor device including the same, and more particularly, to a cover component for realizing thermal insulation and thermal equalization of a high temperature compact pressure sensor for measuring a pressure of a high temperature gas supplied to a semiconductor manufacturing apparatus or the like, and a pressure sensor device including the cover component.

BACKGROUND ART

In a semiconductor manufacturing facility, a chemical plant, or the like, various gases such as a source gas and an etching gas are supplied to a process chamber. As a device for controlling a flow rate of the supplied gas, a mass flow controller (thermal mass flow controller) and a pressure type flow rate control device are known.

The pressure type flow rate control device can control the mass flow of various fluids with high accuracy by a relatively simple configuration combining a control valve and a restriction part (for example, an orifice plate or a critical nozzle) provided downstream thereof. The pressure type flow rate control device has an excellent flow rate control characteristic that flow rate control can be performed stably even if a primary side supply pressure greatly fluctuates (for example, Patent Literature 1).

In the pressure type flow rate control device, a pressure sensor for measuring a pressure (hereinafter, sometimes referred to as an upstream pressure) between the control valve and the restriction part is provided. An output of the pressure sensor is used to feedback control the control valve. By controlling the upstream pressure using the control valve, the flow rate of a gas flowing downstream of the restriction part can be controlled.

As the pressure sensor, a type in which a strain gauge is attached to a diaphragm serving as a pressure sensitive portion is used (for example, Patent Literature 2). The diaphragm type pressure sensor is configured such that the diaphragm deforms or distorts in response to the pressure of the measurement gas to enable the measurement of the gas pressure based on an output of the attached strain gauge.

In recent years, a configuration is known to vaporize a liquid raw material using a vaporization supply device provided upstream of a pressure type flow rate control device, and to supply a generated gas at a desired flow rate (for example, Patent Literature 3). In the vaporization supply device, a liquid raw material, such as trimethylaluminum (TMAl), tetraethyl orthosilicate (TEOS), or silicon hexachloride (HCDS), is pressure filled into a vaporization chamber and heated by a heater. A raw material gas generated in the vaporization chamber as such is supplied to a process chamber while the flow rate is controlled by a downstream pressure type flow rate control device.

PRIOR-ART DOCUMENT

Patent Documents

Patent Literature 1: U.S. Pat. No. 3,546,153
Patent Literature 2: International Publication No. 2020/075600
Patent Literature 3: International Publication No. 2019/021948

SUMMARY OF INVENTION

Technical Problem

The pressure sensor of the pressure type flow rate control device provided downstream of the vaporization supply device may be heated from the surroundings to a high temperature of, for example, 200° C. or more by a heater to prevent re-liquefaction while receiving a high temperature gas. In addition, when a downstream side stop valve is closed, a high pressure gas having a pressure of, for example, 200 kPa or higher may be applied as loads. Therefore, the pressure sensor in this application is required to be able to operate properly even in a high temperature and pressure environment.

In addition, the vaporization supply device and the pressure type flow rate control device may be provided in the vicinity of a process chamber as an integrated gas supply device. In this case, the miniaturization of the entire apparatus including the pressure sensor as much as possible is required, in order to save space for installing valuable equipment around the process chamber.

Accordingly, the pressure sensor described in Patent Literature 2 is a compact high temperature compatible pressure sensor and is fixed so as to have a protruding portion from a mounting surface of a body (a metal body block formed with a flow path). In this configuration, a small attachment member separated from a sensor module is used to fix the device to the body, so that the design of the entire device can be made compact. In addition, when the attachment member is fastened and fixed to the body, stress is hardly transmitted to the diaphragm, so that a decrease in the accuracy of the sensor output due to unintended external stress can be suppressed.

However, the present inventors have found that when a compact high temperature compatible pressure sensor having a portion protruding from the mounting surface of the body is used as it is, the sensor output (in particular, the zero-point output) may become unstable. Then, it was found that the cause was the temperature change or temperature inhomogeneity in the pressure sensor main body and the surrounding environment.

The present invention is made for solving the above problem, and the main object is to provide a pressure sensor device capable of ensuring output stability even being used in a high temperature environment and a cover component for the pressure sensor used in the pressure sensor device.

Solution to Problem

The cover component according to an embodiment of the present invention is used for a pressure sensor fixed to a mounting surface of a body with a flow path formed therein and having a protrusion portion protruding from the mounting surface when fixed. The cover component includes a hollow member having an inner peripheral surface facing a side surface of the protrusion portion of the pressure sensor, and a lid member fixed to the hollow member for covering the protrusion portion of the pressure sensor.

In one embodiment, the hollow member and the lid member are formed of different materials, and a thermal conductivity of the hollow member is higher than a thermal conductivity of the lid member.

In one embodiment, the lid member is formed with a hole or a notch for passing through a cable of the pressure sensor, and the cover component further includes a cable fastener fixed to the lid member for holding the cable extending from the lid member.

In addition, the pressure sensor device according to an embodiment of the present invention includes any one of the above cover components attached to the body, and a pressure sensor attached to the body and covered by any one of the above cover components.

In one embodiment, the pressure sensor is a diaphragm-type pressure sensor comprising a sensor module and a hermetic cover, wherein the sensor module attached with a pressure detection element is a bottomed cylindrical sensor module including a diaphragm as a pressure sensing portion and having on an inner side a pressure receiving chamber communicating with the flow path of the body and the hermetic cover surrounds a vacuum chamber separated from the pressure receiving chamber by the diaphragm.

Effect of Invention

According to the pressure sensor device provided with the cover component related to the embodiments of the present invention, since the thermal equalization of the compact high temperature compatible pressure sensor can be maintained, the stability of output during use in a high-temperature environment can be ensured.

DESCRIPTION OF EMBODIMENTS

Embodiments of the present invention will be described below with reference to the drawings, but the present invention is not limited to the following embodiments.

Figure 1:
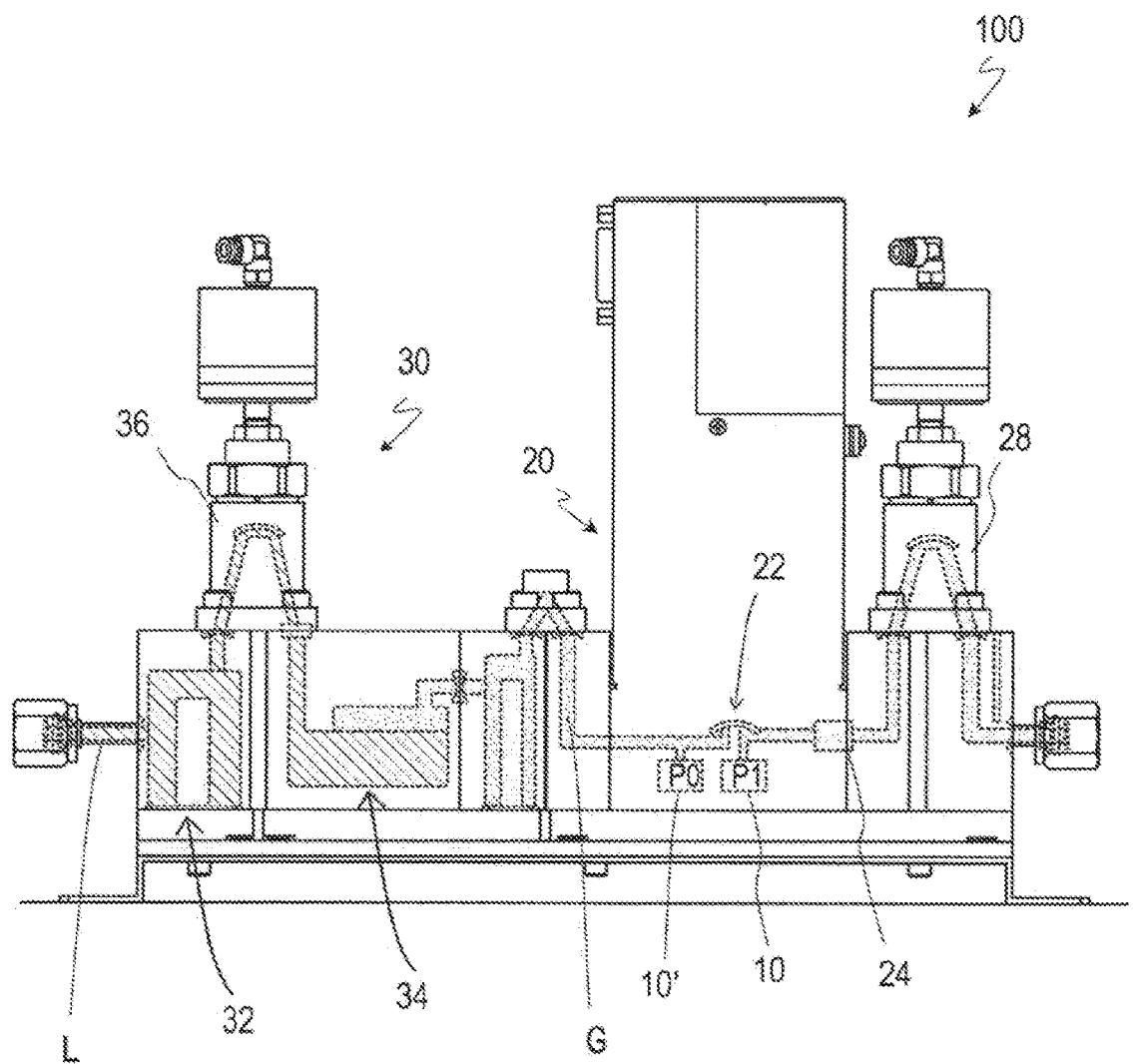
FIG. 1 is a diagram illustrating a gas supply system including a pressure type flow rate control device configured by using a pressure sensor device according to an embodiment of the present invention.
Figure 2:
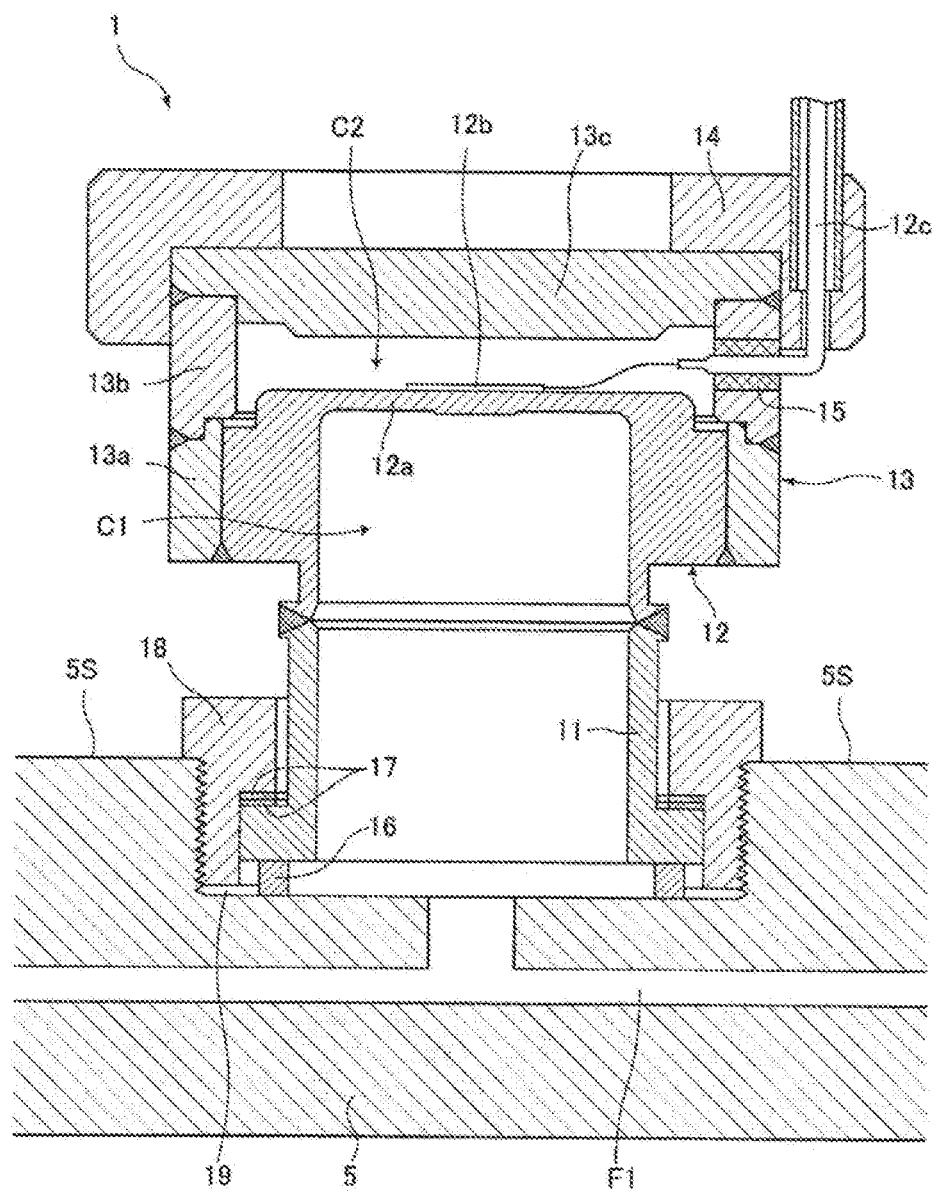
FIG. 2 is a cross-sectional view of the pressure sensor device according to an embodiment of the present invention, illustrating a pressure sensor alone before being covered by a cover component.
Figure 3:
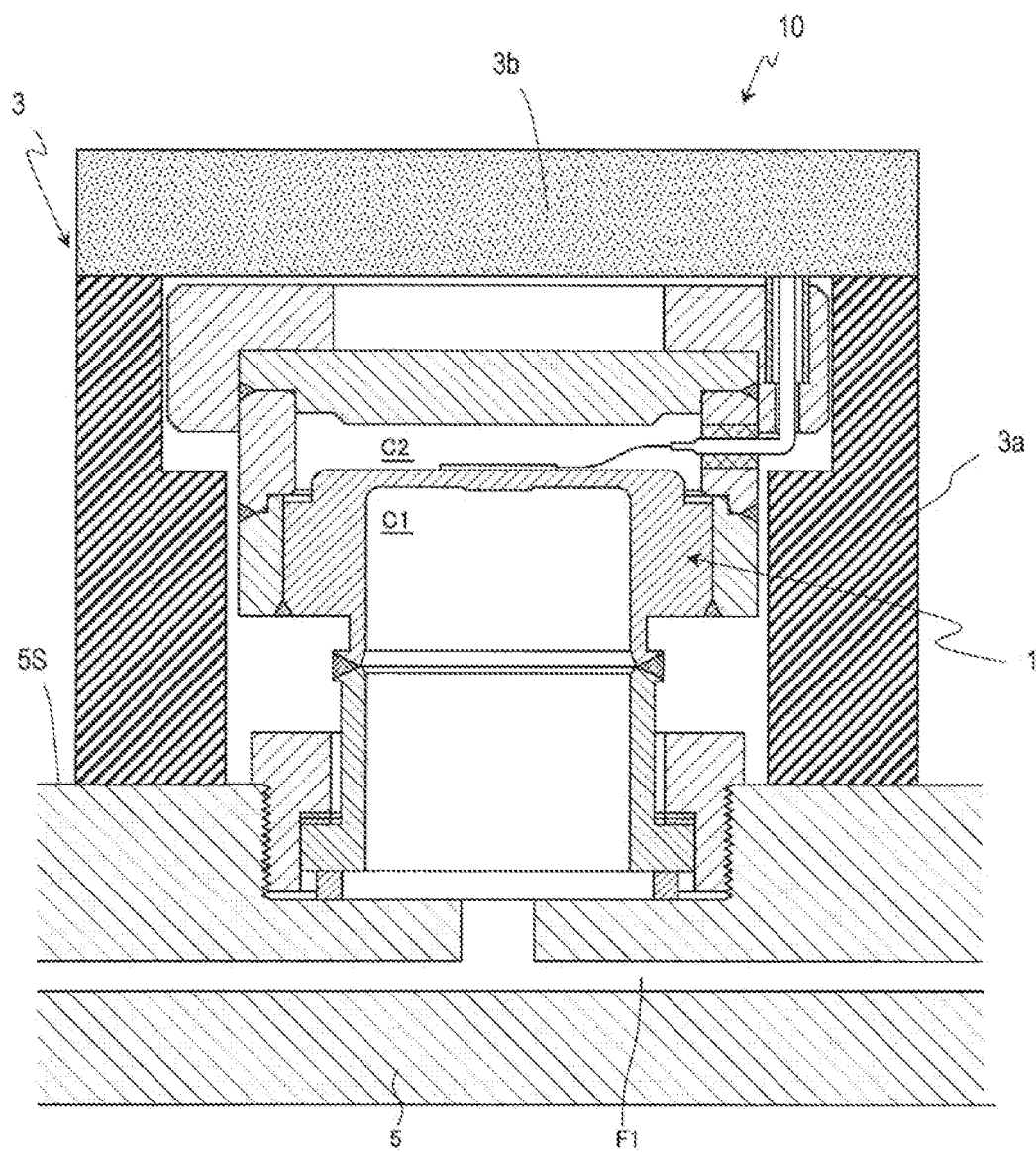
FIG. 3 is a cross-sectional view of a pressure sensor device according to an embodiment of the present invention, illustrating a pressure sensor device configurated by covering the pressure sensor with a cover component.

FIG. 1 illustrates a gas supply system 100 configured by a pressure type flow rate control device 20 including a pressure sensor device 10 according to an embodiment of the present invention and a vaporization supply device 30 provided upstream of the pressure type flow control device 20. FIG. 2 and FIG. 3 illustrate the pressure sensor 1 and the pressure sensor device 10 used in this embodiment.

Note that, in this specification, a device including a pressure sensor 1 and a cover component 3 (described later) surrounding the pressure sensor 1 is referred to as a pressure sensor device 10 for convenience, in order to distinguish from the pressure sensor itself. However, the pressure sensor device 10 is a device having a function of measuring pressure and may be generally referred to as a pressure sensor without particular distinction.

As shown in FIG. 1, the pressure sensor device 10 of the present embodiment is provided in a flow path between a control valve 22 and a restriction part 24 of the pressure type flow rate control device 20. The pressure sensor device 10 is used as an upstream pressure sensor for detecting an upstream pressure (referred to as an upstream pressure P1 or a controlled pressure P1) of the restriction part 24. An output of the pressure sensor device 10 is used for feedback controlling the control valve 22, and by controlling the upstream pressure P1 using the control valve 22, it is possible to control the flow rate of a fluid flowing downstream of the restriction part 24.

More specifically, the pressure type flow rate control device 20 performs the flow rate control by using the following principle: when the critical expansion condition P1/P2≥about 2 (where P1 is the upstream pressure, P2 is the downstream pressure of the restriction part 24, and about 2 corresponds to a nitrogen gas) is satisfied, the flow velocity of the gas passing through the restriction part 24 is fixed to the sound velocity, and the mass flow rate is determined by the upstream pressure P1 regardless of the downstream pressure P2. When the critical expansion condition is satisfied, the flow rate Q is given by $Q=K_1 \cdot P1$ (where $K_1$ is a constant depending on the fluid species and the fluid temperature).

In another embodiment, a downstream pressure sensor for measuring a pressure (a downstream pressure P2) downstream of the restriction part 24 may be provided. In this case, even when the above critical expansion condition is not satisfied, based on the upstream pressure P1 and the downstream pressure P2, the flow rate Q can be calculated from $Q=K_2 \cdot P2^m(P1-P2)^n$ (where $K_2$ is a constant depending on the fluid species and the fluid temperature, m and n are indexes derived from the actual flow rate).

The pressure type flow rate control device 20 adjusts the opening degree of the control valve 22 by a feedback control so that the flow rate Q calculated on the basis of the measured upstream pressure P1 (or the upstream pressure P1 and the downstream pressure P2) approaches an inputted set flow rate. This makes it possible to flow a gas at the set flow rate downstream of the restriction part 24. The flow rate obtained by the calculation as described above may be externally displayed as a flow rate output value.

Furthermore, as shown in FIG. 1, in the present embodiment, a supply pressure sensor device 10' is provided for measuring the pressure (supply pressure P0) upstream of the control valve 22. The output of the supply pressure sensor device 10' is used for controlling an amount of gas produced in the vaporization supply device 30, for example. As same as the pressure sensor device 10, the supply pressure sensor device 10' is also required to operate properly even in a high temperature environment.

Moreover, in the present embodiment, a stop valve 28 is provided downstream of the restriction part 24 of the pressure type flow rate control device 20. By closing the stop valve 28, the gas supply can be reliably stopped as compared with the case where only the control valve 22 is closed.

As the control valve 22 used in the pressure type flow rate control device 20, various valves, whose opening can be adjusted to arbitrary degrees, are used, and for example, a piezo valve configured so as to adjust the opening degree of a diaphragm valve by a piezo actuator is preferably used. As the stop valve 28, an air operated valve (AOV) or a solenoid valve having excellent responsivity and shut-off property is preferably used. As the restriction part 24, an orifice plate or a critical nozzle is preferably used, and the orifice diameter or the nozzle diameter is set to 10 μm to 2000 μm, for example.

On the other hand, the vaporization supply device 30 provided in the gas supply system 100 receives a liquid raw material L, vaporizes it, and sends it to the pressure type flow rate control device 20 as a gas G. The vaporization supply device 30 includes a preheating unit 32 for preheating the liquid raw material L and a vaporization unit 34 connected to the preheating unit 32 via a liquid raw material supply valve 36, so that the supply amount of the liquid raw material to the vaporization unit 34 is controllable by opening and closing the liquid raw material supply valve 36.

The preheating unit 32 of the vaporization supply device 30 is heated to, for example, 180° C., by a heater, and the vaporization unit 34 is heated to, for example, 200° C., further, in order to prevent re-liquefaction of the delivered gas, the pressure type flow rate control device 20 is heated to, for example, 210° C. or higher. Therefore, the pressure sensor device 10 is also heated to a high temperature of 200° C. or higher, and it is required to accurately detect the pressure even in such a high temperature environment.

In the present embodiment, the stop valve 28 is also heated by a heater, and an outlet side of the stop valve 28 is heated to, for example, 220° C. However, it is needless to say that the set temperature of each heater may be arbitrarily selected depending on the material to be vaporized.

FIG. 2 illustrates a diaphragm type pressure sensor 1 used in the pressure sensor device 10 of the present embodiment. Further, FIG. 3 illustrates a pressure sensor device 10 configured by covering the pressure sensor 1 with a cover component 3 as a thermal insulating member. The pressure sensor 1 used in the present embodiment may have the same structure as the pressure sensor described in Patent Literature 2 and is designed as a compact high temperature compatible pressure sensor.

As shown in FIG. 2, the pressure sensor 1 is fixed to a body 5 in which a flow path F1 is formed so as to have a protrusion portion protruding from the mounting surface 5S. In the present embodiment, the body 5 is a metallic block (for example, made of SUS316L) formed with the flow path of the pressure type flow rate control device 20 shown in FIG. 1, and a control valve 22 or the like is attached to an upper surface of the body 5.

Although the pressure sensor device 10 connected to a lower side of the flow path is shown in FIG. 1, in practice, as shown in FIG. 2, the pressure sensor device 10 is fixed side by side with the control valve 22 on the mounting surface 5S of the upper surface of the body 5. In addition, the supply pressure sensor device 10' is fixed to the mounting surface 5S of the upper surface of the body 5 in the same manner.

Furthermore, in the present specification, in correspondence with the drawings, the surface where the mounting surface 5S is formed may be referred to as the upper surface of the body 5, it is needless to say that the mounting surface 5S may be a surface in any direction, such as a vertical upper side surface, a lower side surface, or a side surface, according to the position of the pressure type flow rate control device 20. Moreover, the pressure sensor device 10 is not limited to the surface of the body 5 to which the control valve 22 is attached and may be fixed to an opposite surface or a side surface.

The pressure sensor 1 has a cylindrical member 11 mounted in an airtight manner with respect to the body 5, and a bottomed cylindrical sensor module 12 for detecting the pressure of the fluid flowing through the flow path airtightly connected to the cylindrical member 11. The cylindrical member 11 and the sensor module 12 are fixed in an airtight manner by welding of end flanges (e-beam welding, laser welding, etc.). As disclosed in Patent Literature 2, the cylindrical member 11 and the sensor module 12 may be airtightly fixed by tightly fixing the flange portions with screws or the like while sandwiching a gasket in between.

The sensor module 12 has a diaphragm 12a as a pressure sensing portion. A pressure receiving chamber C1 is surrounded by the diaphragm 12a and a peripheral wall and communicates with the flow path F1 of the body 5 through the inside of the cylindrical member 11.

A pressure detection element 12b having a strain gage is fixed to a surface opposite to the pressure receiving chamber C1 of the diaphragm 12a. In addition, a vacuum chamber C2 is provided on the opposite side of the diaphragm 12a so as to face the pressure receiving chamber C1. The vacuum chamber C2 is a vacuum sealed space formed by airtightly fixing a hermetic cover 13 to the sensor module 12 with a gap between the hermetic cover and the diaphragm 12a.

In order to form the vacuum chamber C2, the hermetic cover 13 includes a base ring 13a airtightly fitted and fixed to the outer peripheral surface of the sensor module 12, a cylindrical hermetic ring 13b whose one end face is airtightly connected to one end face of the base ring 13a, and a closing board 13c airtightly connected to the other end face of the hermetic ring 13b and forms the vacuum chamber C2 with the diaphragm 12a. The base ring 13a, the hermetic ring 13b, and the closing board 13c are airtightly fixed by welding, etc.

The hermetic ring 13b is provided with a low melting point glass member 15 through which a plurality of lead wires 12c connected to the strain gauge of the pressure detection elements 12b passes. The strain gauge is usually constituted by a resistive wire of a metallic foil, and the magnitude of the strain generated in the diaphragm 12a can be detected by detecting a change in the electric resistance of the resistive wire by a connected bridge circuit.

The pressure sensor 1 shown in the figure is provided with a cover member 14 covering the upper surface (closing board 13c) of the hermetic cover 13. The cover member 14 can hold the plurality of lead wires 12c at right angles. The cover member 14 is formed of a synthetic resin material in an annular shape having an L-shaped cross section, and covers the hermetic cover 13. However, the cover member 14 may be omitted if it is not necessary to hold the lead wires 12c.

The pressure sensor 1 having the above configuration is configured to output zero as an absolute pressure when no stress is generated in the diaphragm 12a, that is, when the pressure in the pressure receiving chamber C1 and the pressure in the vacuum chamber C2 are considered to be equal. In addition, a strain having a magnitude corresponding to the pressure of the pressure receiving chamber C1, that is, the pressure of the gas flowing through the flow path F1 is generated in the diaphragm 12a, and the magnitude of the strain is measured by the pressure detection element 12b, whereby the pressure of the gas can be detected.

In the present embodiment, the cylindrical member 11 is made of HASTELLOY C-22 (HASTELLOY is a registered trademark) which is one of the nickel-molybdenum-chromium alloys excellent in corrosion resistance, etc., or SUS316L which is one of the austenitic stainless steels excellent in corrosion resistance, etc. In addition, the inner peripheral surface of the cylindrical member 11 is subjected to electrolytic polishing process.

Furthermore, the sensor module 12 including the diaphragm 12a is made of SPRON510 (SPRON is a registered trademark), which is one of the cobalt-nickel alloys excellent in corrosion resistance, offset yield strength, and elasticity.

Moreover, the base ring 13a constituting the hermetic cover 13 is formed of nickel-molybdenum-chromium alloy or stainless steel (e.g., SUS316L, etc.) having excellent corrosion resistance, etc., and the hermetic ring 13b and the closing board 13c are formed of stainless steel (e.g., SUS316L, etc.) having excellent corrosion resistance, etc.

The pressure sensor 1 (more specifically, the cylindrical member 11) in communication with the flow path F1 of the body 5 is airtightly attached and fixed by a gasket 16, a washer 17, and a bonnet nut 18. A circular insertion hole 19 for attaching the cylindrical member 11 of the pressure sensor 1 is formed in the body 5, and a female screw to which the bonnet nut 18 is detachably screwed is formed on the inner peripheral surface of the insertion hole 19.

The gasket 16 is formed by austenitic stainless steel in a ring shape having a size of being inserted into the insertion hole 19 of the body 5 and has a cross-sectional shape of a rectangle. One end surface of the gasket 16 abuts against a bottom surface of the insertion hole 19 of the body 5, and the other end surface of the gasket 16 abuts against an outer end surface of a mounting flange portion formed in the cylindrical member 11. The shape of the cross-sectional of the gasket 16 may be circular or polygonal.

In the present embodiment, an outer diameter of the cover 14 is set to 20 mm, a height of the sensor module 12 is set to 9.7 mm, an outer diameter of the cylindrical portion of the sensor module 12 is set to 13 mm, an inner diameter of the sensor module is set to 8 mm, an outer diameter of the cylindrical member 11 is set to 10 mm (the mounting flange is 12 mm), and an inner diameter of the cylindrical member 11 is set to 8 mm. However, each of the above-described dimensions may be changed in accordance with each situation.

In addition, as shown in FIG. 3, the pressure sensor device 10 of the present embodiment includes the pressure sensor 1 and the cover component 3 for covering the side surface and the upper surface of the pressure sensor 1. As shown in FIG. 3, the cover component 3 includes a hollow member 3a having an inner peripheral surface facing the side surface of the protruding portion from the mounting surface 5S of the pressure sensor 1, and a lid member 3b fixed to the upper surface of the hollow member 3a and covering the upper surface of the pressure sensor 1.

The cover component 3 is fixed to the body 5 and covers the outside of the pressure sensor 1, so that the pressure sensor 1 can be thermal insulated to prevent a sudden change in temperature. In addition, the temperature uniformity of the pressure sensor 1 can be improved. In order to prevent re-liquefication of the gas, the pressure sensor 1 may be heated by a heater from the outside at a set temperature of, for example, about 200° C. Even at such a high temperature, if the temperature uniformity and thermal insulating properties are maintained, it is possible to stabilize the sensor output, in particular, the zero-point output.

In order to achieve this object, in a preferred embodiment, the hollow member 3a is formed of a metal material having a relatively high thermal conductivity, while the lid member 3b is formed of a resin material having a high temperature resistance and a relatively low thermal conductivity. More specifically, the hollow member 3a is formed of, for example, aluminum, silver, graphene, or the like, and the cover member 3b is formed of, for example, PEEK (polyether ether ketone).

When constituting the hollow member 3a by, for example, an aluminum hollow block material in close contact with the body 5, the ambient temperature of the side surface of the pressure sensor 1 tends to be equal to the temperature of the body 5. In addition, since the thermal conductivity is relatively high, the entire hollow member 3a is easily heated to a uniform temperature, and thus the temperature uniformity of the pressure sensor 1 can be improved.

The outer surface of the hollow member 3a is preferably polished. Since the heat reflectance is improved by using the outer surface as a polished surface, heat dissipation to the outside can be reduced and the heat dissipation to the inside can be efficiently performed. In addition, by reducing the amount of heat dissipation to the outside, it is also possible to obtain an advantage that the high temperature countermeasure can be performed relatively easily.

Furthermore, when an aluminum hollow member 3a is used, it is also preferable that the inner surface, that is, the surface facing the pressure sensor 1 is subjected to an alumite treatment (particularly, a hard alumite treatment). When the inner surface is anodized, the radiation rate is improved and the heat dissipation to the inner side is improved, so that much of the heat from the hollow member 3a can be dissipated to the inner side. Therefore, the heat dissipation to the outside can be suppressed, while the temperature retention in the inner space can be improved.

Moreover, by forming the lid member 3b from a highly thermal insulating material such as PEEK, the inner space of the cover component 3 is easily maintained at a high temperature, and the temperature around the pressure sensor 1 is easily maintained at a constant temperature. In addition, by making the lid member 3b from a resin material, the lead wire 12c for transmitting the pressure signal is not contacted with the metal member, and thus the possibility of electric and thermal disturbance occurring in the lead wire 12c can be reduced.

Hereinafter, a more specific embodiment of the cover component 3 will be described. FIG. 4(a) illustrates a state before assembly of the cover component 3 used in the pressure sensor device 10 for measuring the upstream pressure P1, and FIG. 4(b) illustrates a state after assembly of the cover component 3.

In the cover component 3 of the present embodiment, the aluminum hollow member 3a provided with a cylindrical sensor hole 9a is formed in a cuboid shape, and is fixed to the body 5 (see FIG. 3). The hollow member 3a is fixed to the body by fastening screws 7 to the respective fixing through holes at the four corners.

Note that the hollow member 3a is not necessarily formed from one metal block and may be formed by combining a plurality of metal blocks. The hollow member 3a may be configured by using two block bodies having shapes that are separated by the center line of the sensor hole 9a, for example, and each block body is provided with a recess for forming the sensor hole 9a on an end surface, so that the sensor hole 9a is formed by combining the recesses.

Furthermore, the lid member 3b made of PEEK is fixed to the upper surface of the hollow member 3a by a screw 8. In addition, in the lid member 3b, a cable hole 9b for passing through a signal cable gathering the plurality of lead wires 12c extending from the pressure sensor 1 is provided at a position on the sensor hole 9a of the hollow member 3a. The signal cable connected to the pressure detection element via the cable hole 9b can be connected to an external bridging circuit, so that the pressure detection results can be obtained. The size of the cable hole 9b is not too large, by setting it the same as the cable diameter, the thermal insulating property can be improved.

Moreover, in the cover component 3 of the present embodiment, a metal cable fastener 3c fixed by screws or the like is provided in the vicinity of the cable hole 9b of the lid member 3b. The cable fastener 3c is provided for holding and securing the signal cable connected to the pressure sensor.

Figure 5:
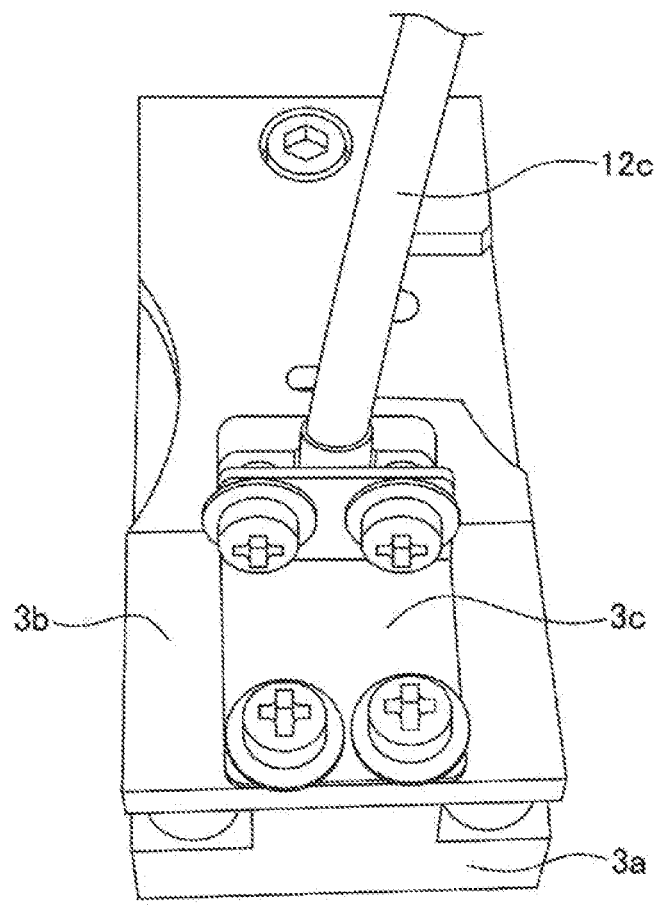
FIG. 5 is a diagram illustrating an example of a cable fastener.

FIG. 5 illustrates the state where the lead wire 12c (sometimes referred to as a signal cable 12c) is secured on the lid member 3b by the cable fastener 3c. The cable fastener 3c can fix the cable by screwing a plate shaped fastener from the outside to a receiving device having an L-shaped cross section fixed to the lid member 3b while sandwiching the signal cable therebetween.

As described above, by fixing the signal cable 12c so as not to move on the lid member 3b, on the inner side of the cover component 3, the signal cable extending from the pressure sensor 1 is hardly move in response to external stresses, vibrations, and temperature changes. As a result, noise components are prevented from getting on the signal, and the signal quality can be improved.

Although the aspect of fixing the signal cable 12c by the cable fastener 3c has been described above, the cable fastener 3c may also be used to fix other cables such as a power cable. The cable fastener 3c can be used to hold and fix various cables and wires, in the present specification, the term "cable" is intended to include a signal cable or a power cable.

The pressure sensor device 10 mounted with the cover component 3 configured as described above is suitably used as a compact pressure sensor for high temperature, in particular, since the zero point output can be stably maintained, by incorporating it into the pressure type flow rate control device. it is expected to ensure a high precision flow rate accuracy over a long period of time.

Figure 6:
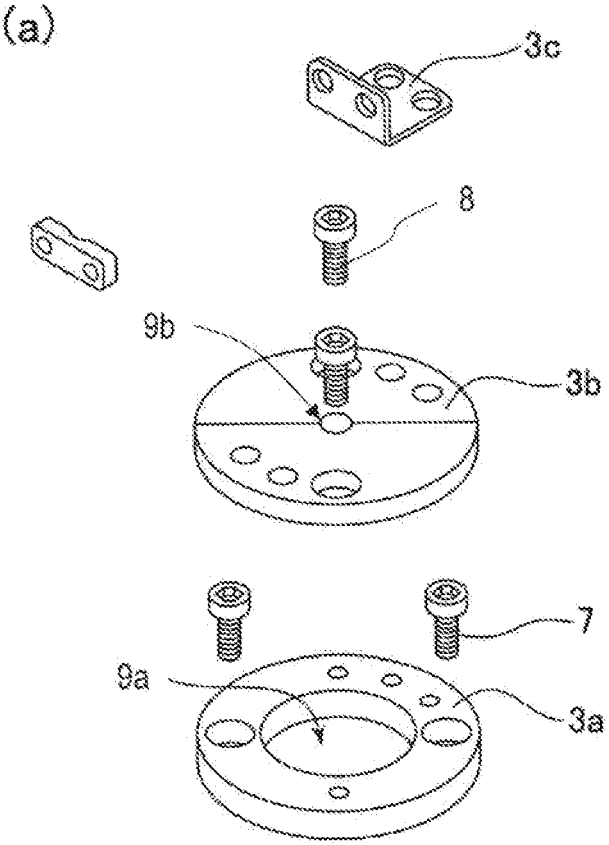
FIG. 6 are diagrams illustrating a cover component according to another embodiment of the present invention, (a) is an exploded perspective view, (b) is a perspective view after assembly.
Figure 6:
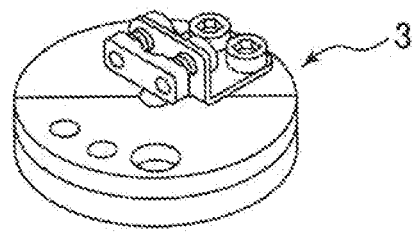
Figure 7:
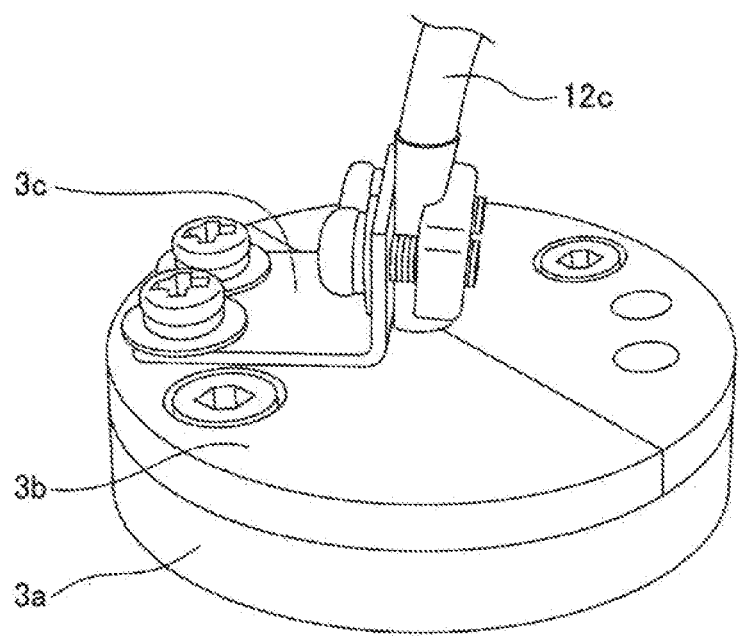
FIG. 7 is a perspective view illustrating a pressure sensor device after mounting.

FIG. 6(a) illustrates a state before assembly of the cover component 3 of another embodiment, and FIG. 6(b) illustrates a state after assembly of the cover component 3. The cover component 3 shown in FIGS. 6(a) and 6(b) is the cover component 3 of another embodiment used in the supply pressure sensor device 10' for measuring the supply pressure P0 shown in FIG. 1. In addition, FIG. 7 illustrates a state in which the signal cable 12c is fixed on the lid member 3b by the cable fastener 3c of the cover component 3 shown in FIGS. 6(a) and 6(b).

In the cover component 3 of the present embodiment, the hollow member 3a is a circular ring-shaped aluminum block in which the sensor hole 9a is provided in the center. In addition, the lid member 3b is a circular plate member made of PEEK and has a shape corresponding to the hollow member 3a. Also in the lid member 3b of the present embodiment, the cable hole 9b is provided in the central portion. Further, on the upper surface of the lid member 3b, the cable fastener 3c for fixing the signal cable 12c connected to the pressure sensor and extending outward via the cable hole 9b is provided.

Also in the present embodiment, the cover component 3 is provided so as to cover the pressure sensor for measuring the supply-pressure P0, so that the thermal insulation property and the heat uniformity are improved. In addition, since the movement of the signal cable is limited by the cable fastener 3c, an appropriate sensor output can be obtained even in a high temperature environment.

Figure 4:
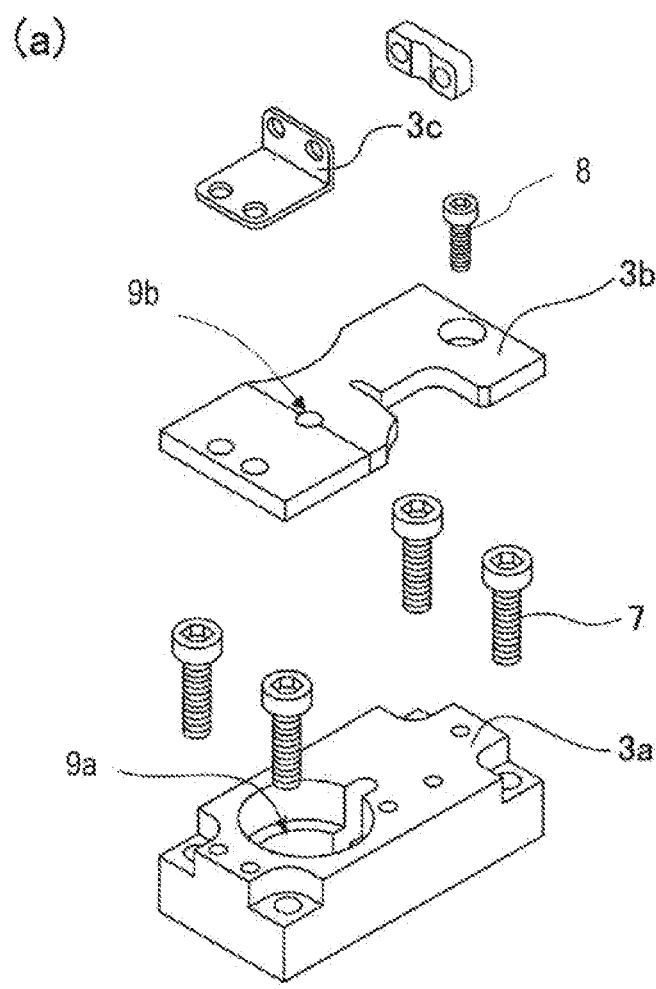
FIG. 4 are diagrams illustrating a cover component according to an embodiment of the present invention, (a) is an exploded perspective view and (b) is a perspective view after assembly.
Figure 4:
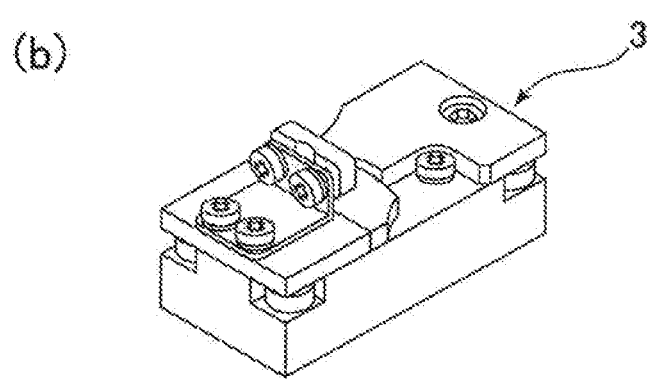

In this manner, the cover component 3 may be designed in an arbitrary shape. Since many components are densely arranged around the pressure sensor 1 for measuring the upstream pressure P1, the configurations as shown in FIGS. 4 and 5 are employed to avoid interference with other components, if interference with other components is not problematic, simpler configurations as shown in FIGS. 6 and 7 may be adopted.

Figure 8:
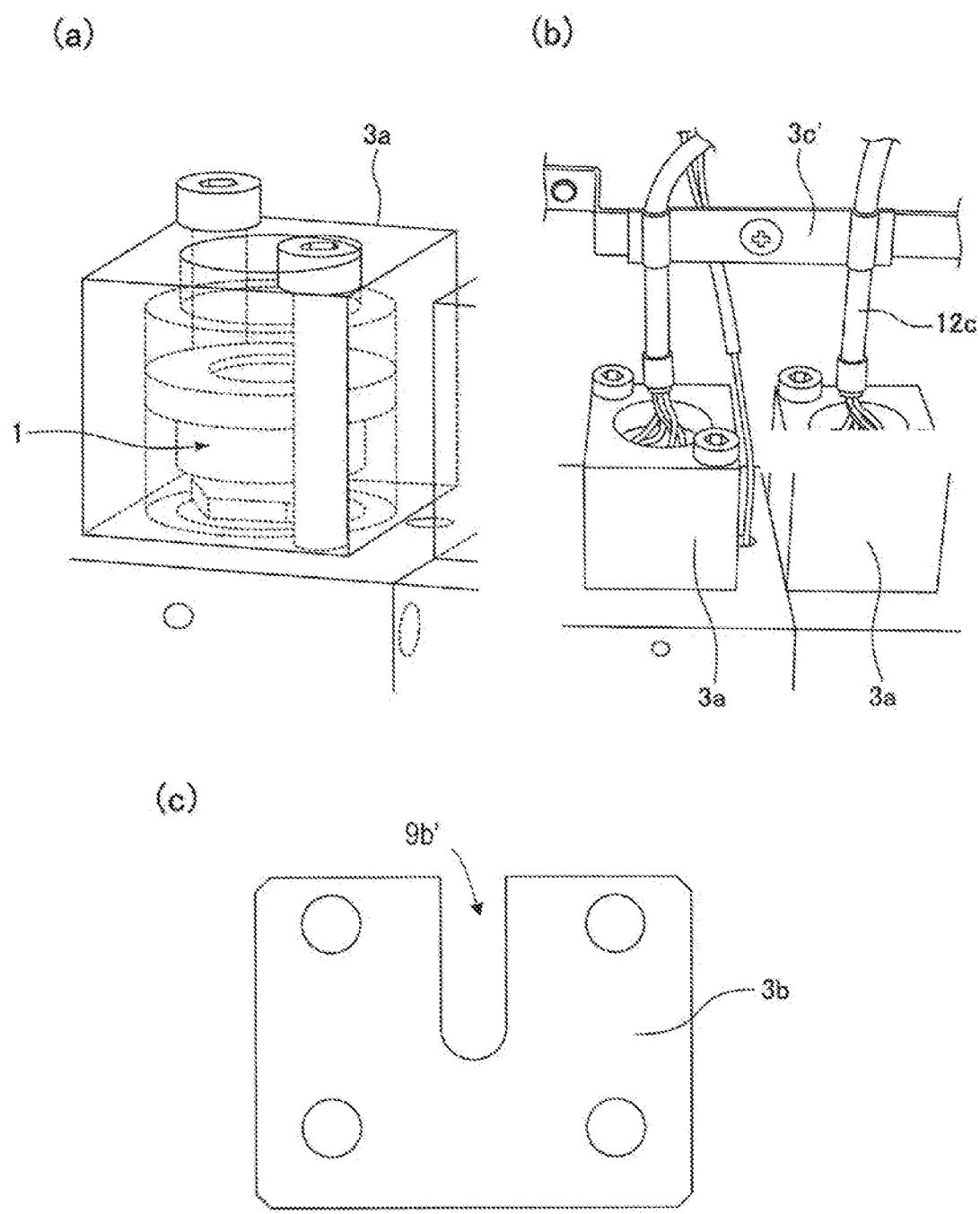
FIG. 8 are diagrams illustrating a cover component according to still another embodiment of the present invention, (a) is a perspective view before attaching the lid member, (b) is a diagrammatic perspective view before attaching the lid member, (c) is a plan view of the lid member.

FIG. 8(a) to FIG. 8(c) are diagrams illustrating the cover component according to still another embodiment. FIG. 8(a) and FIG. 8(b) illustrate the state before attaching the lid member 3b, that is, the state where only the metal hollow member 3a is fixed to the body. FIG. 8(c) illustrates a cover member 3b fixed on the hollow member 3a.

In the present embodiment, the lid member 3b is provided with a notch 9b' for passing through the cable from the pressure sensor. In addition, the cable is not fixed on the lid member 3b but is fixed to a chassis at a place distant from the cover component 3 using a cable fastener 3c'. Even in such an aspect, it is possible to prevent unnecessary movement of the cable, and stabilize the sensor output even in a high temperature environment, while maintaining the temperature of the pressure sensor and performing thermal uniformity.

As described above, while embodiments of the present invention have been described above, various modifications are possible. For example, although the embodiment in which the cover component is provided in the pressure sensor for measuring the supply pressure P0 and the control pressure P1 has been described above, when a downstream pressure sensor for measuring a downstream pressure P2 of the restriction part 24 is used, the cover component may also be provided downstream of the pressure sensor to stabilize the sensor output. In addition, although an aspect in which the lid member 3b is integrated has been described above, the lid member 3b may be configured by combining two halved parts or three or more parts.

INDUSTRIAL APPLICABILITY

The cover component and the pressure sensor device including the cover component according to the embodiments of the present invention are preferably used, for example, for measuring the pressure of a high temperature gas in a semiconductor manufacturing apparatus.

REFERENCE SIGNS LIST

1 Pressure sensor
3 Cover component
3a Hollow member
3b Lid member
3c Cable fastener
5 Body
7 Screw
9a Sensor hole
9b Cable hole 9b' notch
10 Pressure sensor device
11 Cylindrical member
12 Sensor module
12a Diaphragm
12b Pressure detection element
12c Lead wire (signal cable)
13 Hermetic cover
14 Cover body
16 Gasket
18 Bonnet nut
20 Pressure type flow rate control device
22 Control valve
24 Restriction part
26 Inflow pressure sensor
28 Stop valve
30 Vaporization supply device
100 Gas supply system
C1 Pressure receiving chamber
C2 Vacuum chamber
F1 Flow path

The invention claimed is:

1. A cover component for a pressure sensor that is fixed to a mounting surface of a body with a flow path formed therein and has a protrusion portion protruding from the mounting surface when fixed, comprising:
   a hollow member having an inner peripheral surface facing a side surface of the protrusion portion of the pressure sensor; and
   a lid member fixed to the hollow member for covering the protrusion portion of the pressure sensor,
   wherein the lid member is formed with a hole or notch for passing through a cable of the pressure sensor and the cover component further comprises a cable fastener fixed to the lid member for holding the cable extending from the lid member.

2. The cover component according to claim 1, wherein the hollow member and the lid member are formed of different materials, and a thermal conductivity of the hollow member is higher than a thermal conductivity of the lid member.

3. A pressure sensor device comprising:
   the cover component according to claim 1 mounted on the body, and
   a pressure sensor covered by the cover component mounted on the body.

4. The pressure sensor device according to claim 3, wherein the pressure sensor is a diaphragm type pressure sensor comprising a sensor module and a hermetic cover, wherein the sensor module attached with a pressure detection element is a bottomed cylindrical sensor module including a diaphragm as a pressure sensing portion and having on an inner side a pressure receiving chamber communicating with the flow path of the body and the hermetic cover surrounds a vacuum chamber separated from the pressure receiving chamber by the diaphragm.

5. The cover component according to claim 2, wherein the lid member is formed with a hole or notch for passing through a cable of the pressure sensor and the cover component further comprises a cable fastener fixed to the lid member for holding the cable extending from the lid member.

6. The cover component according to claim 1, wherein the hollow member is formed of a metal material and the lid member is formed of a resin material.

7. The cover component according to claim 6, wherein the hollow member is formed of aluminum, the lid member is formed of polyether ether ketone, and an inner surface of the hollow member is subjected to an alumite treatment.

8. The cover component according to claim 1, wherein the lid member is fixed to an upper surface of the hollow member by a screw.

* * * * *